(12) United States Patent
Yu et al.

(10) Patent No.: US 12,395,122 B2
(45) Date of Patent: Aug. 19, 2025

(54) MULTI-INPUT SHUTDOWN DEVICE AND CONTROL METHOD THEREFOR, AND PHOTOVOLTAIC POWER GENERATION SYSTEM

(71) Applicant: HOYMILES POWER ELECTRONICS INC., Hangzhou (CN)

(72) Inventors: Hongbin Yu, Hangzhou (CN); Yanliang Cai, Hangzhou (CN); Qiang Rong, Hangzhou (CN); Yi Zhao, Hangzhou (CN); Bo Yang, Hangzhou (CN)

(73) Assignee: HOYMILES POWER ELECTRONICS INC., Hangzhou (CN)

( * ) Notice: Subject to any disclaimer, the term of this patent is extended or adjusted under 35 U.S.C. 154(b) by 0 days.

(21) Appl. No.: 18/719,025

(22) PCT Filed: Mar. 31, 2022

(86) PCT No.: PCT/CN2022/084356
§ 371 (c)(1),
(2) Date: Jun. 12, 2024

(87) PCT Pub. No.: WO2023/134027
PCT Pub. Date: Jul. 20, 2023

(65) Prior Publication Data
US 2025/0055415 A1   Feb. 13, 2025

(30) Foreign Application Priority Data
Jan. 13, 2022  (CN) .......................... 202210036769.3

(51) Int. Cl.
H02S 40/30 (2014.01)
H02H 7/20 (2006.01)
H02S 50/10 (2014.01)

(52) U.S. Cl.
CPC ............... H02S 40/30 (2014.12); H02H 7/20 (2013.01); H02S 50/10 (2014.12)

(58) Field of Classification Search
CPC ............ H02S 40/30; H02S 50/10; H02H 7/20
(Continued)

(56) References Cited

U.S. PATENT DOCUMENTS

2024/0186790 A1*  6/2024  Lumanog .................. H02J 3/38

FOREIGN PATENT DOCUMENTS

| CN | 110299727 A | 10/2019 |
| CN | 111313825 A | 6/2020 |

(Continued)

OTHER PUBLICATIONS

ISR for International Application PCT/CN2022/084356 mailed Sep. 28, 2022.
(Continued)

Primary Examiner — Michael R. Fin
(74) Attorney, Agent, or Firm — Ladas & Parry LLP

(57) ABSTRACT

A multi-input shutdown device, including: a first input port, configured to be coupled to a first photovoltaic unit; at least one second input port, configured to be coupled to a second photovoltaic unit, where the second photovoltaic unit includes at least one cell substring and a freewheeling diode connected in parallel to the cell substring; a first shutdown module including a first switching device and a first bypass device, where the first bypass device is configured to provide a bypass path for a power bus current when the first photovoltaic unit is abnormal; at least one second shutdown module, including a second switching device; and a control
(Continued)

module, configured to control the second switching device to be turned on when the second photovoltaic unit is abnormal, so that the second switching device and the freewheeling diode in the second photovoltaic unit provide a bypass path for the power bus current.

20 Claims, 4 Drawing Sheets

(58) Field of Classification Search
USPC .......................................................... 307/43
See application file for complete search history.

(56) References Cited

FOREIGN PATENT DOCUMENTS

| | | |
|---|---|---|
| CN | 113270893 A | 8/2021 |
| CN | 113659929 A | 11/2021 |
| CN | 215498289 U | 1/2022 |
| CN | 114050811 A | 2/2022 |

OTHER PUBLICATIONS

Written Opinion for International Application PCT/CN2022/084356 mailed Sep. 28, 2022.

* cited by examiner

MULTI-INPUT SHUTDOWN DEVICE AND CONTROL METHOD THEREFOR, AND PHOTOVOLTAIC POWER GENERATION SYSTEM

CROSS-REFERENCE TO RELATED APPLICATIONS

This application is an application under 35 U.S.C. 371 of International Application No. PCT/CN2022/084356 filed on 31 Mar. 2022. This application claims priority to Chinese Patent Application No. CN202210036769.3 filed on 13 Jan. 2022 which are incorporated herein by reference in its entirety.

TECHNICAL FIELD

The present invention relates to the field of distributed photovoltaic power generation technologies, and in particular, to a multi-input shutdown device and a control method therefor, and a photovoltaic power generation system.

BACKGROUND

Due to the renewability and cleanness of solar energy, a photovoltaic power generation technology has developed rapidly. A string photovoltaic power generation system has been widely used in the field of photovoltaic power generation due to advantages of mature technologies, high conversion efficiency, and low price. However, a direct-current high voltage of the string photovoltaic power generation system may cause fires and electric shock. When a fire occurs in a photovoltaic power generation system, a great security threat is brought to a fire-fighting operation of firefighters. An existing solution is to configure a module-level rapid shutdown device for each photovoltaic module, for example, a shutdown device. When an abnormal situation such as a fire occurs, the shutdown device is used to shut off an output of each photovoltaic module and reduce an output voltage of the photovoltaic module, thereby reducing a risk of electric shock for the firefighters and operation and maintenance personnel.

A mainstream shutdown device on the market is generally configured with two input ports, and connected to two photovoltaic modules. Costs for per watt are reduced by multiplexing a controller and structures. An existing two-input shutdown device is shown in FIG. 1. The shutdown device includes a communication module, a control module, bypass diodes D1 to D3, and safety switches Q1 and Q2. The bypass diode D1 is configured to bypass a first photovoltaic module when the first photovoltaic module is abnormal, and the bypass diode D2 is configured to bypass a second photovoltaic module when the second photovoltaic module is abnormal. When both the first photovoltaic module and the second photovoltaic module are abnormal, a large current in a power bus passes through the bypass diodes D1 and D2, causing a relatively large power loss and high heat generation. Further, an improved solution is to connect a bypass diode D3 in parallel to an output port of the shutdown device. When both the first photovoltaic module and the second photovoltaic module are abnormal or the controller is abnormal, the first photovoltaic module and the second photovoltaic module are bypassed by the bypass diode D3, thereby reducing freewheeling loss and heat generation. However, this method requires a large quantity of diodes and is costly.

SUMMARY

In view of this, an objective of the present invention is to provide a multi-input shutdown device and a control method therefor. By multiplexing a freewheeling diode built in a photovoltaic module, a bypass device in a corresponding shutdown module of the shutdown device is omitted and a bypass loss inside the shutdown device is reduced.

To achieve the foregoing objective, the present invention provides a multi-input shutdown device, including:

a first input port, configured to be coupled to a first photovoltaic unit, where the first photovoltaic unit includes at least one cell substring and a freewheeling diode connected in parallel to the cell substring;

at least one second input port, configured to be coupled to a second photovoltaic unit, where the second photovoltaic unit includes at least one cell substring and a freewheeling diode connected in parallel to the cell substring;

a first shutdown module, coupled to the first input port, where the first shutdown module includes a first switching device and a first bypass device, the first switching device is configured to control a connection between the first photovoltaic unit and a power bus, and the first bypass device is configured to provide a bypass path for a power bus current when the first photovoltaic unit is abnormal;

at least one second shutdown module, coupled to the second input port, where the second shutdown module includes a second switching device;

a control module, powered from the first input port, configured to control the first switching device and the second switching device respectively based on a monitoring signal and a communication signal; and an output port, configured to be coupled to the power bus, where outputs of the first shutdown module and the second shutdown module are connected in series to the output port; and the control module controls the second switching device to be turned on when the second photovoltaic unit is abnormal, so that the second switching device and the freewheeling diode in parallel with the cell substring in the second photovoltaic unit provide a bypass path for the power bus current.

Further, the shutdown device further includes a second bypass device connected in parallel to the output port, when the control module is faulty, the first switching device and the second switching device are both turned off, the first bypass device is turned off, and the second bypass device provides a bypass path for the power bus current.

Further, when both the first photovoltaic unit and the second photovoltaic unit are abnormal, the control module controls the first switching device to be turned off and the second switching device to be turned on or to be in a high-frequency switching state, the second bypass device provides a first bypass path for the power bus current, the freewheeling diode in parallel with the cell substring in the second photovoltaic unit, the second switching device, and the first bypass device provide a second bypass path for the power bus current.

Further, when both the first photovoltaic unit and the second photovoltaic unit are abnormal, the control module controls the first switching device and the second switching device to be turned off, and the second bypass device provides a bypass path for the power bus current.

Further, the first bypass device and the second bypass device are diodes or switches.

Further, the first switching device is connected between a positive terminal of the first input port and a positive terminal of the output port, the first bypass device is connected in parallel to the output of the first shutdown module, and the second switching device is connected between a positive terminal of the second input port and a negative terminal of the first input port or connected between a positive terminal of the second input port and a negative terminal of an adjacent second input port; or the first switching device is connected between a negative terminal of the first input port and a positive terminal of the second input port, the first bypass device is connected in parallel to the output of the first shutdown module, and the second switching device is connected between a negative terminal of the second input port and a negative terminal of the output port or connected between a negative terminal of the second input port and a positive terminal of an adjacent second input port.

Further, the control module determines states of the first photovoltaic unit and the second photovoltaic unit based on the monitoring signal, and the monitoring signal includes input voltages of the first input port and the second input port; and when the input voltage of the first input port or the input voltage of the second input port is less than a voltage threshold, the control module determines that a photovoltaic unit coupled to the input port is abnormal, otherwise, determines that the photovoltaic unit coupled to the input port is normal.

Further, the communication signal is a power line carrier communication signal or a wireless communication signal.

Further, the communication signal includes control instructions of the shutdown device, the control module adjusts an operating mode of the shutdown device based on the control instructions, and the operating mode of the shutdown device includes a safe mode and a normal operating mode, where when the shutdown device is in the safe mode, the control module controls the first switching device and the second switching device to be turned off, and the first photovoltaic unit and the second photovoltaic unit are disconnected from the power bus; and when the shutdown device is in the normal operating mode, and both the first photovoltaic unit and the second photovoltaic unit are normal, the control module controls the first switching device to be turned on, and controls the second switching device to be turned on or to be in a high-frequency switching state, the first bypass device is turned off, and both the first photovoltaic unit and the second photovoltaic unit are connected to the power bus.

To achieve the foregoing objective, the present invention provides a control method for a multi-input shutdown device. The method is used for controlling a multi-input shutdown device having a first input port and at least one second input port, the first input port is coupled to a first photovoltaic unit, the second input port is coupled to a second photovoltaic unit, the first photovoltaic unit and the second photovoltaic unit respectively include at least one cell substring and a freewheeling diode connected in parallel to the cell substring, and the method includes:

controlling a first switching device and a second switching device in the shutdown device respectively based on a monitoring signal and a communication signal; and controlling the second switching device to be turned on when the second photovoltaic unit is abnormal, so that the second switching device and the freewheeling diode in parallel with the cell substring in the second photovoltaic unit provide a bypass path for a power bus current.

To achieve the foregoing objective, the present invention provides a photovoltaic power generation system. The system includes a plurality of photovoltaic units, a plurality of multi-input shutdown devices, a main controller, and a photovoltaic inverter. Each of the plurality of multi-input shutdown devices is connected to the plurality of photovoltaic units, outputs of the plurality of multi-input shutdown devices are connected in series to a power bus, and the power bus is connected to a direct-current input port of the photovoltaic inverter. The multi-input shutdown device includes a first input port, at least one second input port, a first shutdown module, at least one second shutdown module, a control module, and an output port. The first input port is coupled to a first photovoltaic unit, the first photovoltaic unit includes at least one cell substring and a freewheeling diode connected in parallel to the cell substring, the second input port is coupled to a second photovoltaic unit, the second photovoltaic unit includes at least one cell substring and a freewheeling diode connected in parallel to the cell substring, the first shutdown module includes a first switching device and a first bypass device, and the second shutdown module includes a second switching device, where the main controller sends a communication signal periodically, and the communication signal is used for controlling the multi-input shutdown device; and the shutdown device is configured to control the switching of the first switching device and the second switching device respectively based on a monitoring signal and the communication signal, and when the second photovoltaic unit is abnormal, control the second switching device to be turned on, so that the second switching device and the freewheeling diode in parallel with the cell substring in the second photovoltaic unit provide a bypass path for a power bus current.

Compared with the prior art, the present invention provides a multi-input shutdown device and a control method therefor, and beneficial effects brought are as follows: By multiplexing a freewheeling diode built in a photovoltaic module, a bypass device in a corresponding shutdown module of the shutdown device is omitted, which not only reduces a quantity of bypass devices, but also transfers a bypass loss to the freewheeling diode built in the photovoltaic module, thereby reducing the bypass loss and heat generation of the shutdown device and improving efficiency. This solution simplifies the circuit structure of the shutdown device and reduces costs of the shutdown device.

DETAILED DESCRIPTION

The present invention is described in detail below with reference with specific implementations shown in the accompanying drawings. However, the implementations do not limit the present invention, and structural, method, or functional transformations made by a person of ordinary skill in the art according to the implementations all fall within the protection scope of the present invention.

When a component is referred to as being "connected to" or "combined to" another component, the component may be directly on, directly connected to, or directly combined to the another component, or there may be an intermediate component between them. However, when a component is referred to as being "directly connected to" or "directly combined to" another component, there is no intermediate component between them. Therefore, the term "connection" may refer to a physical connection, an electrical connection, and the like, and there is an intermediate component or no intermediate component.

Figure 1:
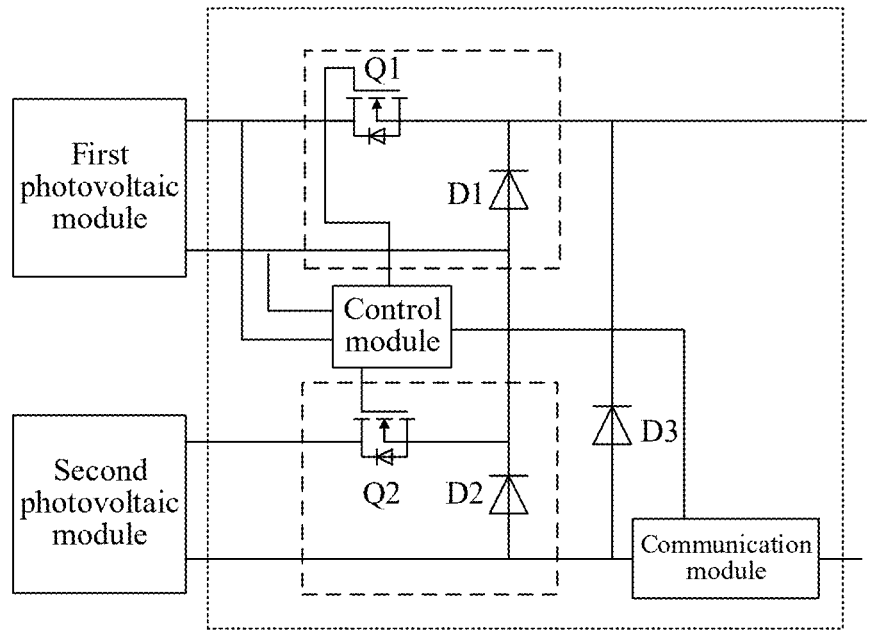
FIG. 1 is a schematic diagram of a shutdown device in a prior art.
Figure 2:
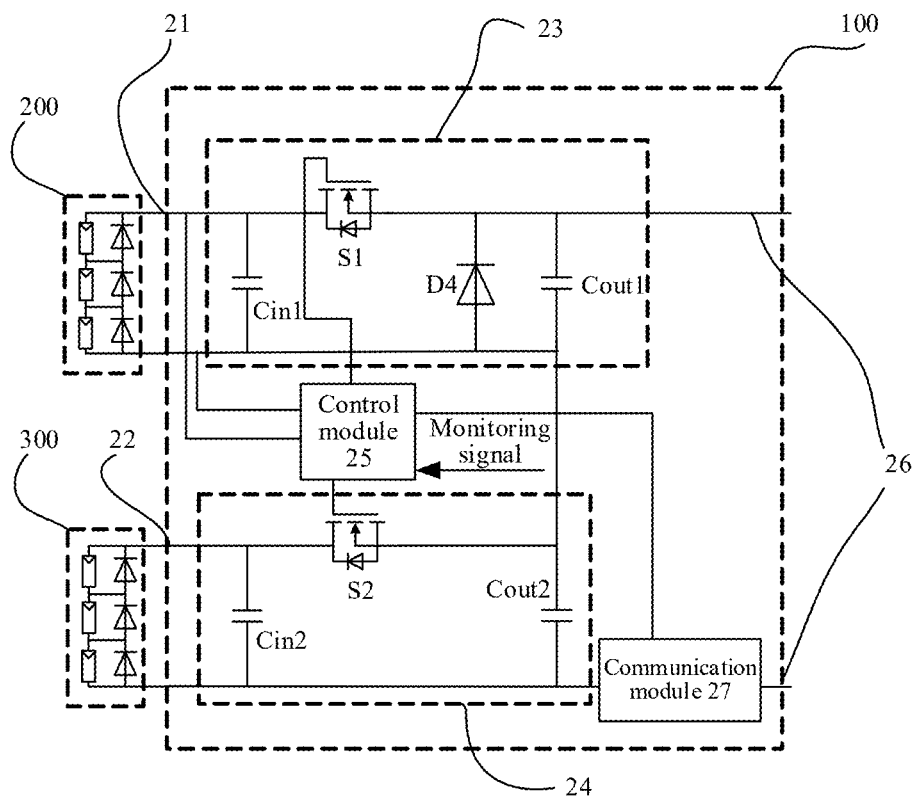
FIG. 2 is a schematic diagram of a multi-input shutdown device according to a first embodiment of the present invention.

FIG. 2 is a schematic circuit diagram of a multi-input shutdown device according to a first embodiment of the present invention. The multi-input shutdown device 100 includes:

a first input port 21, configured to be coupled to a first photovoltaic unit 200, where the first photovoltaic unit 200 includes at least one cell substring and a freewheeling diode connected in parallel to the cell substring;

at least one second input port 22, configured to be coupled to a second photovoltaic unit 300, where the second photovoltaic unit 300 includes at least one cell substring and a freewheeling diode connected in parallel to the cell substring;

a first shutdown module 23, coupled to the first input port 21, where the first shutdown module 23 includes a first switching device S1 and a first bypass device D4, the first switching device S1 is configured to control a connection between the first photovoltaic unit 200 and a power bus, and the first bypass device D4 is configured to provide a bypass path for a power bus current when the first photovoltaic unit 200 is abnormal;

at least one second shutdown module 24, coupled to the second input port 22, where the second shutdown module 24 includes a second switching device S2;

a control module 25, powered from the first input port 21, configured to control the first switching device S1 and the second switching device S2 respectively based on a monitoring signal and a communication signal; and an output port 26, configured to be coupled to the power bus, where outputs of the first shutdown module 23 and the second shutdown module 24 are connected in series to the output port 26; and when the second photovoltaic unit 300 coupled to the second input port 22 is abnormal, the control module 25 controls the second switching device S2 to be turned on, so that the second switching device S2 and the freewheeling diode in parallel with the cell substring in the second photovoltaic unit 300 provide a bypass path for the power bus current.

As an implementation of the present invention, the first photovoltaic unit 200 includes at least one photovoltaic module, each photovoltaic module includes at least one cell substring and a freewheeling diode connected in parallel to the cell substring, the second photovoltaic unit 300 includes at least one photovoltaic module, and each photovoltaic module includes at least one cell substring and a freewheeling diode connected in parallel to the cell substring.

The following is described by using an example in which the multi-input shutdown device 100 includes one first input port 21, one second input port 22, one first shutdown module 23, one second shutdown module 24, and one output port 26, where the first shutdown module 23 includes the first switching device S1 and the first bypass device D4, the second shutdown module 24 includes the second switching device S2, the first photovoltaic unit 200 includes one photovoltaic module, the photovoltaic module includes three cell substrings and freewheeling diodes connected in parallel to the cell substrings, the second photovoltaic unit 300 includes one photovoltaic module, and the photovoltaic module includes three cell substrings and freewheeling diodes connected in parallel to the cell substrings. However, the present invention is not limited thereto.

Specifically, the first shutdown module 23 includes the first switching device S1 and the first bypass device D4, and the first bypass device D4 is a diode. The first switching device S1 is connected between a positive terminal of the first input port 21 and a positive terminal of the output port 26, where a source of the first switching device S1 is connected to the positive terminal of the output port 26, and a drain of the first switching device S1 is connected to the positive terminal of the first input port 21. The first switching device S1 controls the connection between the first photovoltaic unit 200 coupled to the first input port 21 and the power bus. The first bypass device D4 is connected in parallel to the output of the first shutdown module 23, where a cathode of the first bypass device D4 is connected to the positive terminal of the output port 26, and an anode of the first bypass device D4 is connected to a negative terminal of the first input port 21. When the first photovoltaic unit 200 is abnormal, the first bypass device D4 is configured to provide a bypass path for the power bus current. The second shutdown module 24 includes the second switching device S2. The second switching device S2 is connected between a negative terminal of the first input port 21 and a positive terminal of the second input port 22, where a source of the second switching device S2 is connected to the negative terminal of the first input port 21, and a drain of the second switching device S2 is connected to the positive terminal of the second input port 22. The second switching device S2 controls the connection between the second photovoltaic unit 300 coupled to the second input port 22 and the power bus. When the second photovoltaic unit 300 is abnormal, the second switching device S2 and the freewheeling diode in parallel with the cell substring in the second photovoltaic unit 300 provide a bypass path for the power bus current.

As an implementation of the present invention, the first switching device S1 may be connected between the negative terminal of the first input port 21 and the positive terminal of the second input port 22, where the source of the first switching device S1 is connected to the negative terminal of the first input port 21, and the drain of the first switching device S1 is connected to the positive terminal of the second input port 22. The second switching device S2 is connected between a negative terminal of the second input port 22 and a negative terminal of the output port 26, where the source of the second switching device S2 is connected to the negative terminal of the second input port 22, and the drain of the second switching device S2 is connected to the negative terminal of the output port 26.

As an implementation of the present invention, the control module 25 determines states of the first photovoltaic unit 200 and the second photovoltaic unit 300 based on the monitoring signal. The monitoring signal includes input/output electrical parameters of the shutdown device 100, and the input/output electrical parameters include an output voltage of a photovoltaic unit coupled to an input port of the shutdown device 100, that is, input voltages of the first input port 21 and the second input port 22 of the shutdown device 100. When the input voltage of the first input port 21 or the input voltage of the second input port 22 of the shutdown device 100 is less than a voltage threshold, it is determined that a photovoltaic unit coupled to the input port is abnormal, otherwise, it is determined that the photovoltaic unit coupled to the input port is normal. Abnormal conditions of the photovoltaic unit include blocked, faulty, and the like.

As an implementation of the present invention, the communication signal includes control instructions of the shutdown device 100, the control module 25 adjusts an operating mode of the shutdown device 100 based on the control instructions, and the operating mode of the shutdown device 100 includes a safe mode and a normal operating mode.

When the shutdown device 100 is in the safe mode, the control module 25 controls the first switching device S1 and the second switching device S2 to be off, the first photovoltaic unit 200 and the second photovoltaic unit 300 are disconnected from the power bus, and an output voltage and a power of the shutdown device 100 are in a safe and controlled state.

When the shutdown device 100 is in the normal operating mode, and the first photovoltaic unit 200 and the second photovoltaic unit 300 are normal, the control module 25 controls the first switching device S1 to be on, and controls the second switching device S2 to be on or to be in a high-frequency switching state, the first bypass device D4 is reverse blocking, the first photovoltaic unit 200 connected to the first input port 21 and the second photovoltaic unit 300 connected to the second input port 22 are connected to the power bus, and an output power of the shutdown device 100 is equal to a sum of output powers of the first photovoltaic unit 200 and the second photovoltaic unit 300. When the first photovoltaic unit 200 is abnormal, to prevent the control module 25 from power failure, the control module 25 controls the first switching device S1 to be turned off, the first photovoltaic unit 200 is disconnected from the power bus, the first bypass device D4 is turned on, and the power bus current flows through the first bypass device D4. When the second photovoltaic unit 300 is abnormal, the control module 25 controls the second switching device S2 to be turned on or to be in a high-frequency switching state, the power bus current flows through the freewheeling diode in parallel with the cell substring in the second photovoltaic unit 300 and the second switching device S2, and the freewheeling diode built in the second photovoltaic unit 300 and the second switching device S2 provide a bypass path for the power bus current. When the second switching device S2 is in the high-frequency switching state, at a moment that the second switching device S2 is turned off, an output capacitor of the second shutdown module 24 freewheels for a short time.

As an implementation of the present invention, the shutdown device 100 further includes a communication module 27 for communication, configured to obtain a communication signal, and demodulate and parse the communication signal to obtain the control instructions of the shutdown device. The communication module 27 is, for example, a power line carrier communication module or a wireless communication module. Correspondingly, the communication signal is a power line carrier communication signal or a wireless communication signal. The control module 25 switches the operating mode of the shutdown device 100 based on the control instructions of the shutdown device. In this implementation, the communication signal is a power line carrier communication signal.

As an implementation of the present invention, the communication module 27 may be integrated together with the control module 25.

As an implementation of the present invention, the first shutdown module 23 further includes a first input capacitor Cin1 coupled to the first input port 21 and a first output capacitor Cout1 coupled to the positive terminal of the output port 26. The first input capacitor Cin1 is configured to stabilize the input voltage of the first input port 21 of the shutdown device 100, and the first output capacitor Cout1 is configured to stabilize the output voltage of the shutdown device 100. The second shutdown module 24 further includes a second input capacitor Cin2 coupled to the second input port 22 and a second output capacitor Cout2 coupled to the negative terminal of the output port 26. The second input capacitor Cin2 is configured to stabilize the input voltage of the second input port 22 of the shutdown device 100, the second output capacitor Cout2 is configured to stabilize the output voltage of the shutdown device 100, and the first output capacitor Cout1 and the second output capacitor Cout2 are connected in series to the output port 26.

Figure 3:
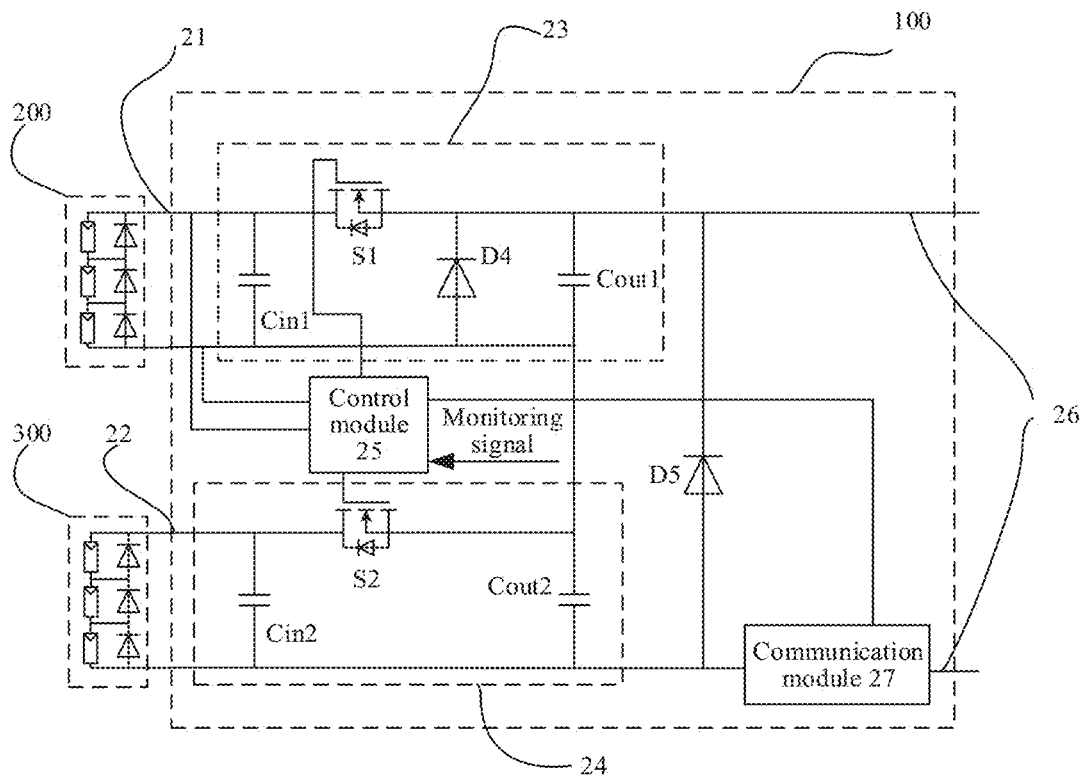
FIG. 3 is a schematic diagram of a multi-input shutdown device according to a second embodiment of the present invention.

FIG. 3 is a schematic circuit diagram of a multi-input shutdown device 100 according to a second embodiment of the present invention. Compared with the first embodiment shown in FIG. 2, in this embodiment, the multi-input shutdown device 100 further includes a second bypass device D5 connected in parallel to the output port 26. The second bypass device D5 provides a bypass path for the power bus current in case of failure of the control module 25. In addition, when the first photovoltaic unit 200 and the second photovoltaic unit 300 are abnormal, a new bypass path passing through the second bypass device D5 is added based on the bypass path of the first embodiment.

Specifically, the second bypass device D5 is a diode. When the control module 25 is faulty, the first switching device S1 and the second switching device S2 are both turned off, the first bypass device D4 is turned off, and the second bypass device D5 provides a bypass path for the power bus current. When the first photovoltaic unit 200 and the second photovoltaic unit 300 are abnormal, the control module 25 controls the first switching device S1 to be turned off and the second switching device S2 to be turned on, the second bypass device D5 provides a first bypass path for the power bus current, and the freewheeling diode in parallel with the cell substring in the second photovoltaic unit 300, the second switching device S2, and the first bypass device D4 provide a second bypass path for the power bus current.

As an implementation of the present invention, when the first photovoltaic unit 200 and the second photovoltaic unit 300 are abnormal, the control module 25 can also control the first switching device S1 and the second switching device S2 to be turned off, the first bypass device D4 is off, and the second bypass device D5 provides a bypass path for the power bus current.

Other parts of the second embodiment that are the same as those of the first embodiment are not described herein again. Compared with the first embodiment, a bypass device is added to provide a bypass path when the control module is faulty, which may be applied in a wider range. In addition, when the photovoltaic units coupled to the input ports of the shutdown device are all abnormal, a new bypass path is provided.

Figure 4:
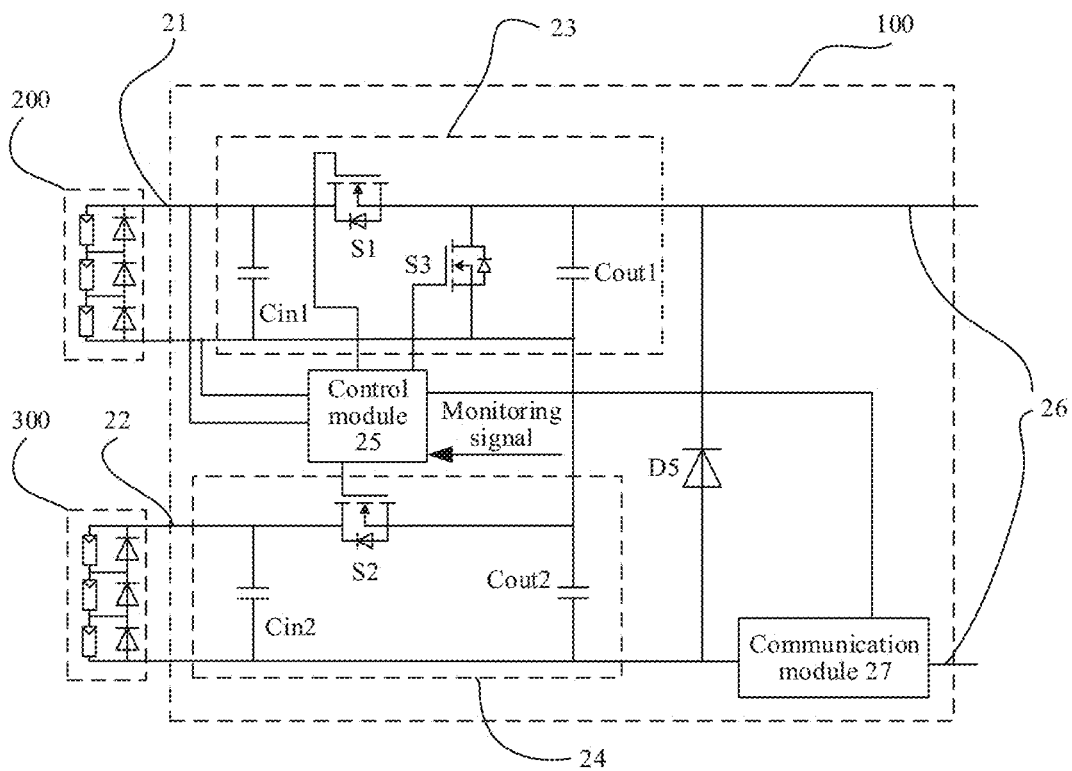
FIG. 4 is a schematic diagram of a multi-input shutdown device according to a third embodiment of the present invention.

FIG. 4 is a schematic circuit diagram of a multi-input shutdown device 100 according to a third embodiment of the present invention. Compared with the second embodiment shown in FIG. 3, in this embodiment, the first bypass device D4 in the first shutdown module 23 is replaced with a third switching device S3 to reduce a turn-on loss during the freewheeling of the power bus current when the first photovoltaic unit 200 is abnormal. A working principle of the switching device of the third embodiment is the same as that of the second embodiment, and details are not described again.

Figure 5:
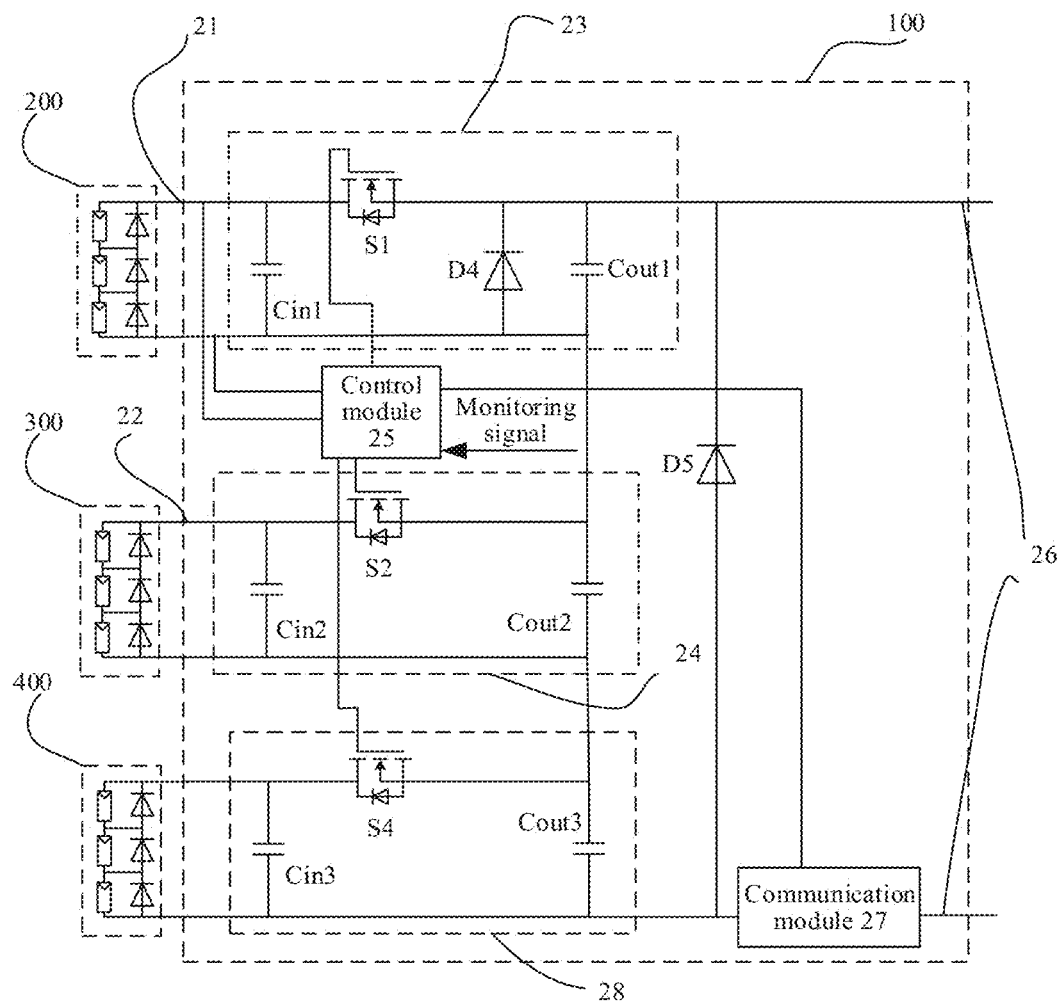
FIG. 5 is a schematic diagram of a multi-input shutdown device according to a fourth embodiment of the present invention.

FIG. 5 is a schematic circuit diagram of a multi-input shutdown device 100 according to a fourth embodiment of the present invention. Compared with the second embodiment shown in FIG. 3, in this embodiment, the multi-input shutdown device 100 further includes a second shutdown module 28 that is connected in series to the output port 26 with the first shutdown module 23 and the second shutdown module 24. A structure of the second shutdown module 28 is the same as that of the second shutdown module 24, and details are not described herein again. A working principle of the fourth embodiment is the same as that of the second embodiment, and details are not described herein again. In this embodiment, a shutdown device with three input ports is used as an example for description, but the present invention is not limited thereto, and the shutdown device may include any quantity of input ports, for example, four, five, and the like.

As an implementation of the present invention, the present invention provides a control method for a multi-input shutdown device 100, the method is applied to a multi-input shutdown device having a first input port 21 and at least one second input port 22, the first input port 21 is coupled to a first photovoltaic unit 200, the second input port 22 is coupled to a second photovoltaic unit 300, the first photovoltaic unit 200 includes at least one cell substring and a freewheeling diode connected in parallel to the cell substring, and the second photovoltaic unit 300 includes at least one cell substring and a freewheeling diode connected in parallel to the cell substring. The method includes:

controlling a first switching device S1 and a second switching device S2 in the multi-input shutdown device 100 respectively based on a monitoring signal and a communication signal; and controlling the second switching device S2 to be turned on when the second photovoltaic unit 200 is abnormal, so that the second switching device S2 and the freewheeling diode in parallel with the cell substring in the second photovoltaic unit 200 provide a bypass path for a power bus current.

States of the first photovoltaic unit 200 and the second photovoltaic unit 300 are determined based on the monitoring signal. The monitoring signal includes input/output electrical parameters of the shutdown device 100, and the input/output electrical parameters include an output voltage of a photovoltaic unit coupled to an input port of the shutdown device 100, that is, an input voltage of the input port of the shutdown device 100. When an input voltage of an input port of the shutdown device 100 is less than a voltage threshold, it is determined that a photovoltaic unit coupled to the input port is abnormal, otherwise, it is determined that the photovoltaic unit coupled to the input port is normal. Abnormal conditions of the photovoltaic unit include blocked, faulty, and the like.

The communication signal includes control instructions of the shutdown device 100, and an operating mode of the shutdown device is switched based on the control instructions. The operating mode of the shutdown device 100 includes a safe mode and a normal operating mode.

When the shutdown device 100 is in the safe mode, the first switching device S1 and the second switching device S2 are controlled to be off, the first photovoltaic unit 200 and the second photovoltaic unit 300 are disconnected from the power bus, and an output voltage and a power of the shutdown device 100 are in a safe and controlled state.

When the shutdown device 100 is in the normal operating mode, and the first photovoltaic unit 200 and the second photovoltaic unit 300 are normal, the first switching device S1 is controlled to be on, the second switching device S2 is controlled to be on or is in a high-frequency switching state, the first bypass device D4 in the shutdown device 100 is reverse blocking, the first photovoltaic unit 200 connected to the first input port 21 and the second photovoltaic unit 300 connected to the second input port 22 are connected to the power bus, and an output power of the shutdown device 100 is equal to a sum of output powers of the first photovoltaic unit 200 and the second photovoltaic unit 300. When the first photovoltaic unit 200 is abnormal, the first switching device S1 is controlled to be turned off, the first photovoltaic unit 200 is disconnected from the power bus, the first bypass device D4 is turned on, and the power bus current flows through the first bypass device D4. When the second photovoltaic unit 300 is abnormal, the second switching device S2 is controlled to be turned on or to be in a high-frequency switching state, the power bus current flows through the freewheeling diode in parallel with the cell substring in the second photovoltaic unit 300 and the second switching device S2, and the freewheeling diode built in the second photovoltaic unit 300 and the second switching device S2 provide a bypass path for the power bus current. When the second switching device S2 is in the high-frequency switching state, at a moment that the second switching device S2 is turned off, a second output capacitor Cout2 freewheels for a short time.

Figure 6:
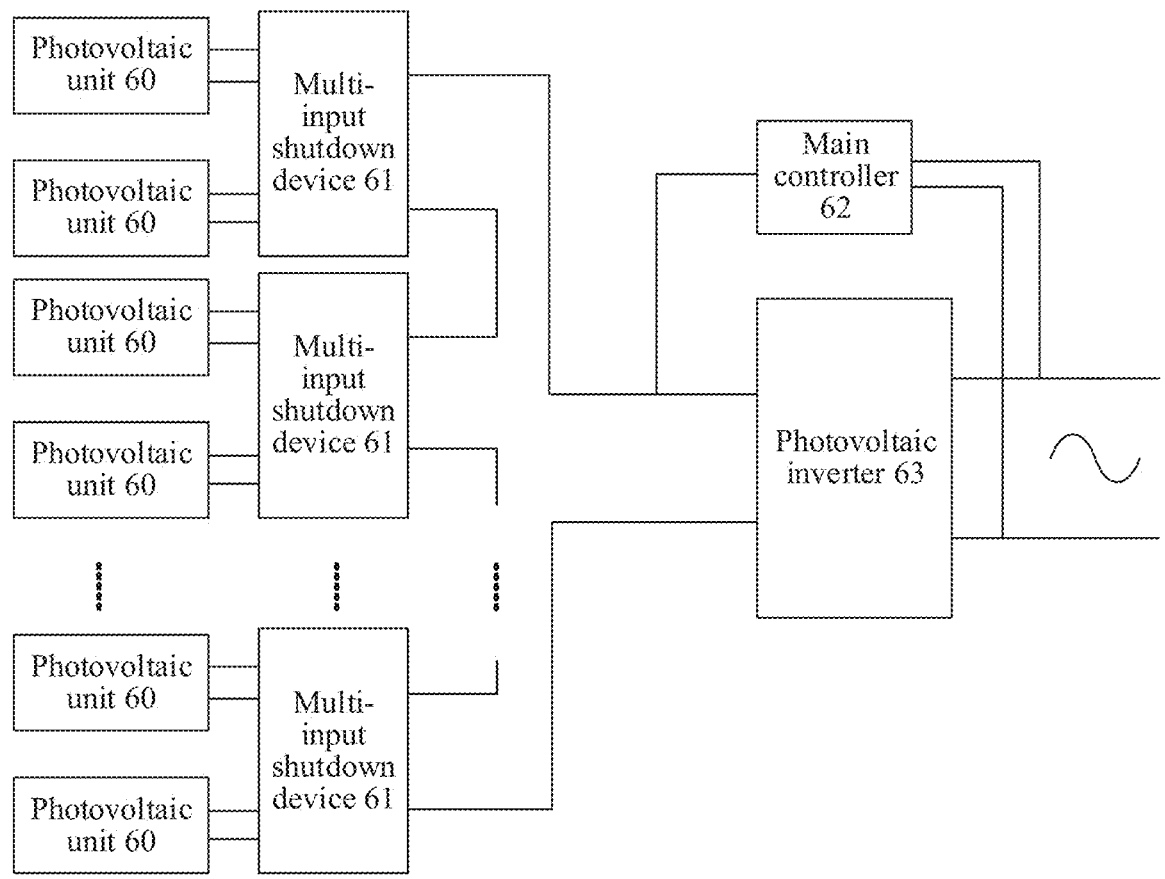
FIG. 6 is a block diagram of a photovoltaic power generation system according to the present invention.

FIG. 6 is a schematic block diagram of a photovoltaic power generation system according to an embodiment of the present invention. The system includes a plurality of photovoltaic units 60, a plurality of multi-input shutdown devices 61 according to any of the foregoing embodiments, a main controller 62, and a photovoltaic inverter 63. Each of the plurality of multi-input shutdown devices 61 is connected to a plurality of photovoltaic units 60, the plurality of multi-input shutdown devices 61 are connected in series to a power bus, and the power bus is connected to a direct-current input port of the photovoltaic inverter 63. The multi-input shutdown device includes a first input port 21, at least one second input port 22, a first shutdown module 23, at least one second shutdown module 24, a control module 25, and an output port 26. The first input port 21 is coupled to a first photovoltaic unit 200, the first photovoltaic unit 200 includes at least one cell substring and a freewheeling diode connected in parallel to the cell substring, the second input port 22 is coupled to a second photovoltaic unit 300, the second photovoltaic unit 300 includes at least one cell substring and a freewheeling diode connected in parallel to the cell substring, the first shutdown module 23 includes a first switching device S1 and a first bypass device D4, and the second shutdown module 24 includes a second switching device S2, wherein, the main controller 62 sends a communication signal periodically, and the communication signal is used for controlling the multi-input shutdown device 61.

Specifically, the communication signal may be a power line carrier communication signal or a wireless communication signal, where the power line carrier communication signal can be coupled to the multi-input shutdown device 61 through the power bus, and the wireless communication signal can be coupled to the multi-input shutdown device 61 through space.

The multi-input shutdown device 61 is configured to control the first switching device S1 and the second switching device S2 respectively based on a monitoring signal and the communication signal, and control the second switching device S2 to be turned on when the second photovoltaic unit 300 is abnormal, so that the second switching device S2 and the freewheeling diode in parallel with the cell substring in the second photovoltaic unit 300 provide a bypass path for a power bus current.

The main controller 62 may be integrated inside the photovoltaic inverter 63, or may be arranged independently, but is not limited thereto.

Although preferred implementations of the present invention have been disclosed for illustrative purposes, a person of ordinary skill in the art should be aware that, various modifications, additions, and replacements may be made without departing from the scope and spirit of the present invention as disclosed by the appended claims.

What is claimed is:

1. A multi-input shutdown device, wherein the shutdown device comprises:
   a first input port, configured to be coupled to a first photovoltaic unit, wherein the first photovoltaic unit comprises at least one cell substring and a freewheeling diode connected in parallel to the cell substring;
   at least one second input port, configured to be coupled to a second photovoltaic unit, wherein the second photovoltaic unit comprises at least one cell substring and a freewheeling diode connected in parallel to the cell substring;
   a first shutdown module, coupled to the first input port, wherein the first shutdown module comprises a first switching device and a first bypass device, the first switching device is configured to control a connection between the first photovoltaic unit and a power bus, and the first bypass device is configured to provide a bypass path for a power bus current when the first photovoltaic unit is abnormal;
   at least one second shutdown module, coupled to the second input port, wherein the second shutdown module comprises a second switching device;
   a control module, powered from the first input port, configured to control the first switching device and the second switching device respectively based on a monitoring signal and a communication signal; and
   an output port, configured to be coupled to the power bus, wherein outputs of the first shutdown module and the second shutdown module are connected in series to the output port; and
   the control module controls the second switching device to be turned on when the second photovoltaic unit is abnormal, so that the second switching device and the freewheeling diode in parallel with the cell substring in the second photovoltaic unit provide a bypass path for the power bus current.

2. The multi-input shutdown device according to claim 1, wherein the shutdown device further comprises a second bypass device connected in parallel to the output port, when the control module is faulty, the first switching device and the second switching device are turned off, the first bypass device is turned off, and the second bypass device provides a bypass path for the power bus current.

3. The multi-input shutdown device according to claim 2, wherein when the first photovoltaic unit and the second photovoltaic unit are abnormal, the control module controls the first switching device to be turned off and the second switching device to be turned on or to be in a high-frequency switching state, the second bypass device provides a first bypass path for the power bus current, the freewheeling diode in parallel with the cell substring in the second photovoltaic unit, the second switching device, and the first bypass device provide a second bypass path for the power bus current.

4. The multi-input shutdown device according to claim 2, wherein when the first photovoltaic unit and the second photovoltaic unit are abnormal, the control module controls the first switching device and the second switching device to be turned off, and the second bypass device provides a bypass path for the power bus current.

5. The multi-input shutdown device according to claim 2, wherein the first bypass device and the second bypass device are diodes or switches.

6. The multi-input shutdown device according to claim 1, wherein
   the first switching device is connected between a positive terminal of the first input port and a positive terminal of the output port, the first bypass device is connected in parallel to an output of the first shutdown module, and the second switching device is connected between a positive terminal of the second input port and a negative terminal of the first input port or connected between a positive terminal of the second input port and a negative terminal of an adjacent second input port; or
   the first switching device is connected between a negative terminal of the first input port and a positive terminal of the second input port, the first bypass device is connected in parallel to an output of the first shutdown module, and the second switching device is connected between a negative terminal of the second input port and a negative terminal of the output port or connected between a negative terminal of the second input port and a positive terminal of an adjacent second input port.

7. The multi-input shutdown device according to claim 6, wherein the control module determines states of the first photovoltaic unit and the second photovoltaic unit based on the monitoring signal, and the monitoring signal comprises input voltages of the first input port and the second input port; and
   when the input voltage of the first input port or the input voltage of the second input port is less than a voltage threshold, the control module determines that a photovoltaic unit coupled to the input port is abnormal, otherwise, determines that the photovoltaic unit coupled to the input port is normal.

8. The multi-input shutdown device according to claim 7, wherein the communication signal is a power line carrier communication signal or a wireless communication signal.

9. The multi-input shutdown device according to claim 7, wherein the communication signal comprises control instructions of the shutdown device, the control module adjusts an operating mode of the shutdown device based on the control instructions, and the operating mode of the shutdown device comprises a safe mode and a normal operating mode, wherein
   when the shutdown device is in the safe mode, the control module controls the first switching device and the second switching device to be turned off, and the first photovoltaic unit and the second photovoltaic unit are disconnected from the power bus; and when the shutdown device is in the normal operating mode, and the first photovoltaic unit and the second photovoltaic unit are normal, the control module controls the first switching device to be turned on, and controls the second switching device to be turned on or to be in a high-frequency switching state, the first bypass device is turned off, and the first photovoltaic unit and the second photovoltaic unit are connected to the power bus.

10. A control method for a multi-input shutdown device, wherein the method is used for controlling a multi-input shutdown device having a first input port, a first shutdown module coupled to the first input port, at least one second input port and at least one second shutdown module coupled to the second input port, the first input port is configured to be coupled to a first photovoltaic unit, the second input port is configured to be coupled to a second photovoltaic unit, the first photovoltaic unit and the second photovoltaic unit respectively comprise at least one cell substring and a freewheeling diode connected in parallel to the cell substring, the first shutdown module comprises a first switching device and a first bypass device, the second shutdown module comprises a second switching device, and the method comprises:

controlling the first switching device and the second switching device in the shutdown device respectively based on a monitoring signal and a communication signal; and controlling the second switching device to be turned on when the second photovoltaic unit is abnormal, so that the second switching device and the freewheeling diode in parallel with the cell substring in the second photovoltaic unit provide a bypass path for a power bus current.

11. The control method for a multi-input shutdown device according to claim 10, wherein the shutdown device further comprises a second bypass device connected in parallel to an output port of the shutdown device, when a control module used to control the first switching device and the second switching device is faulty, the first switching device and the second switching device are turned off, the first bypass device is turned off, and the second bypass device provides a bypass path for the power bus current.

12. The control method for a multi-input shutdown device according to claim 10, wherein the shutdown device further comprises a second bypass device connected in parallel to an output port of the shutdown device, the method further comprises:

when the first photovoltaic unit and the second photovoltaic unit are abnormal, controlling the first switching device to be turned off and the second switching device to be turned on or to be in a high-frequency switching state, the second bypass device provides a first bypass path for the power bus current, the freewheeling diode in parallel with the cell substring in the second photovoltaic unit, the second switching device, and the first bypass device provide a second bypass path for the power bus current.

13. The control method for a multi-input shutdown device according to claim 10, wherein the shutdown device further comprises a second bypass device connected in parallel to an output port of the shutdown device, the method further comprises:

when the first photovoltaic unit and the second photovoltaic unit are abnormal, controlling the first switching device and the second switching device to be turned off, and the second bypass device provides a bypass path for the power bus current.

14. The control method for a multi-input shutdown device according to claim 10, wherein the method further comprises:

determining states of the first photovoltaic unit and the second photovoltaic unit based on the monitoring signal, and the monitoring signal comprises input voltages of the first input port and the second input port, when the input voltage of the first input port or the input voltage of the second input port is less than a voltage threshold, it is determined that a photovoltaic unit coupled to the input port is abnormal, otherwise, it is determined that the photovoltaic unit coupled to the input port is normal.

15. The control method for a multi-input shutdown device according to claim 14, wherein the communication signal comprises control instructions of the shutdown device, the method further comprises:

adjusting an operating mode of the shutdown device based on the control instructions, and the operating mode of the shutdown device comprises a safe mode and a normal operating mode, when the shutdown device is in the safe mode, the first switching device and the second switching device are turned off, and the first photovoltaic unit and the second photovoltaic unit are disconnected from the power bus; and when the shutdown device is in the normal operating mode, and the first photovoltaic unit and the second photovoltaic unit are normal, the first switching device is turned on, the second switching device is turned on or in a high-frequency switching state, the first bypass device is turned off, and the first photovoltaic unit and the second photovoltaic unit are connected to the power bus.

16. A photovoltaic power generation system, wherein the system comprises a plurality of photovoltaic units, a plurality of multi-input shutdown devices, a main controller, and a photovoltaic inverter, each of the plurality of multi-input shutdown devices is connected to a plurality of photovoltaic units, outputs of the plurality of multi-input shutdown devices are connected in series to a power bus, the power bus is connected to a direct-current input port of the photovoltaic inverter, the multi-input shutdown device comprises a first input port, one second input port, a first shutdown module, at least one second shutdown module, a control module, and an output port, the first input port is coupled to a first photovoltaic unit, the first photovoltaic unit comprises at least one cell substring and a freewheeling diode connected in parallel to the cell substring, the second input port is coupled to a second photovoltaic unit, the second photovoltaic unit comprises at least one cell substring and a freewheeling diode connected in parallel to the cell substring, the first shutdown module comprises a first switching device and a first bypass device, and the second shutdown module comprises a second switching device, wherein the main controller sends a communication signal periodically, and the communication signal is used for controlling the multi-input shutdown device; and the multi-input shutdown device is configured to control the first switching device and the second switching device respectively based on a monitoring signal and the communication signal, and control the second switching device to be turned on when the second photovoltaic unit is abnormal, so that the second switching device and the freewheeling diode in parallel with the cell substring in the second photovoltaic unit provide a bypass path for a power bus current.

17. The photovoltaic power generation system according to claim 16, wherein the shutdown device further comprises:
a second bypass device, connected in parallel to the output port;
when the control module is faulty, the first switching device and the second switching device are turned off, the first bypass device is turned off, and the second bypass device provides a bypass path for the power bus current.

18. The photovoltaic power generation system according to claim 16, wherein the first switching device is connected between a positive terminal of the first input port and a positive terminal of the output port, the first bypass device is connected in parallel to an output of the first shutdown module, and the second switching device is connected between a positive terminal of the second input port and a negative terminal of the first input port or connected between a positive terminal of the second input port and a negative terminal of an adjacent second input port; or
the first switching device is connected between a negative terminal of the first input port and a positive terminal of the second input port, the first bypass device is connected in parallel to an output of the first shutdown module, and the second switching device is connected between a negative terminal of the second input port and a negative terminal of the output port or connected between a negative terminal of the second input port and a positive terminal of an adjacent second input port.

19. The photovoltaic power generation system according to claim 18, wherein the control module determines states of the first photovoltaic unit and the second photovoltaic unit based on the monitoring signal, and the monitoring signal comprises input voltages of the first input port and the second input port; and
when the input voltage of the first input port or the input voltage of the second input port is less than a voltage threshold, the control module determines that a photovoltaic unit coupled to the input port is abnormal, otherwise, determines that the photovoltaic unit coupled to the input port is normal.

20. The photovoltaic power generation system according to claim 19, wherein the communication signal comprises control instructions of the shutdown device, the control module adjusts an operating mode of the shutdown device based on the control instructions, and the operating mode of the shutdown device comprises a safe mode and a normal operating mode, wherein
when the shutdown device is in the safe mode, the control module controls the first switching device and the second switching device to be turned off, and the first photovoltaic unit and the second photovoltaic unit are disconnected from the power bus; and
when the shutdown device is in the normal operating mode, and the first photovoltaic unit and the second photovoltaic unit are normal, the control module controls the first switching device to be turned on, and controls the second switching device to be turned on or to be in a high-frequency switching state, the first bypass device is turned off, and the first photovoltaic unit and the second photovoltaic unit are connected to the power bus.

* * * * *